Figure 1:
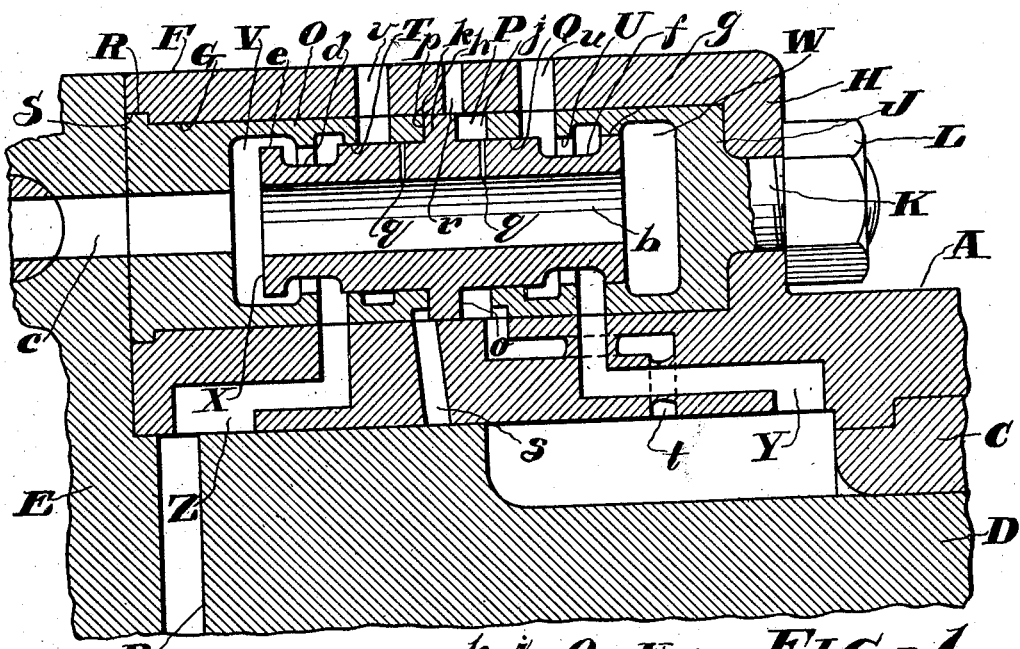

July 29, 1930.   R. H. WILHELM   1,771,868
VALVE FOR ROCK DRILLS
Filed April 14, 1927

INVENTOR.
Russell H. Wilhelm.
BY
HIS ATTORNEY.

Patented July 29, 1930

1,771,868

UNITED STATES PATENT OFFICE

RUSSELL H. WILHELM, OF EASTON, PENNSYLVANIA, ASSIGNOR TO INGERSOLL-RAND COMPANY, OF JERSEY CITY, NEW JERSEY, A CORPORATION OF NEW JERSEY

VALVE FOR ROCK DRILLS

Application filed April 14, 1927. Serial No. 183,793.

This invention relates to fluid actuated rock drills, but more particularly to a distributing valve for rock drills of the hammer type.

The objects of the invention are to obtain a distributing valve of light weight capable of rapid reciprocation in order to distribute the pressure fluid to the cylinder, and to insure against rebounding of the valve from its extreme positions before completion of an adequate charge of pressure fluid to the ends of the cylinder.

Other objects will be in part obvious and in part pointed out hereinafter.

Figure 2:
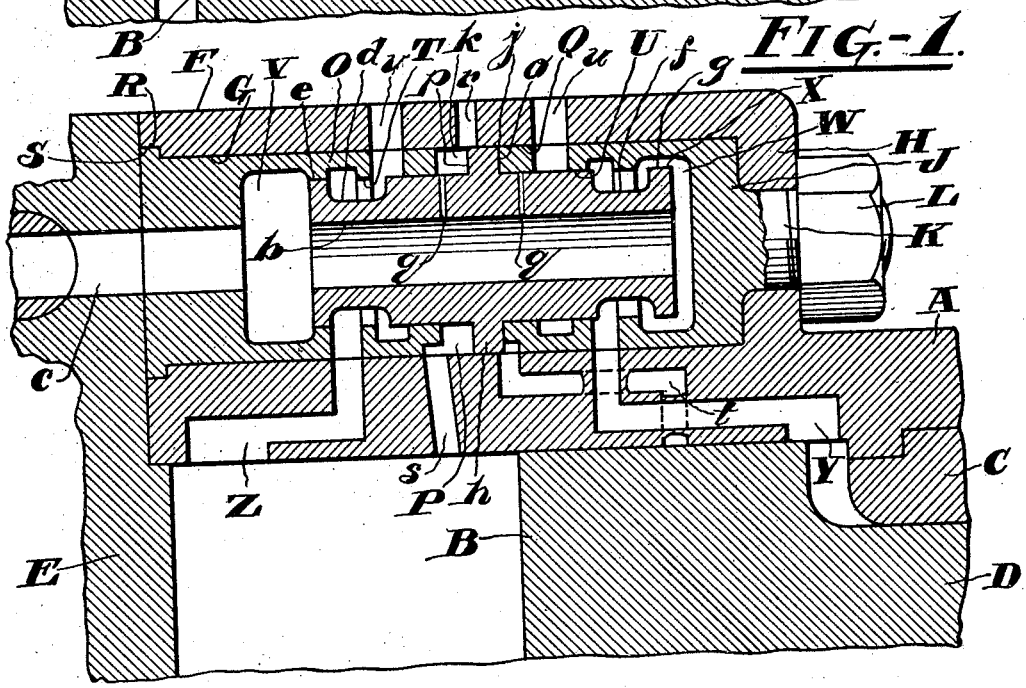

In the drawings illustrating a practical application of the invention,

Figure 1 is a longitudinal sectional elevation of a portion of a rock drill showing the valve in one of its extreme positions, and Figure 2 is a view similar to Figure 1 illustrating the other extreme position of the valve.

Referring to the drawings, the invention is shown embodied in a rock drill having a cylinder A provided with a reciprocatory hammer piston B. A bushing C forms a closure for the front end of the cylinder and is bored to receive slidably a shank D of the piston. The rearward end of the cylinder A is sealed by a back head E which extends across the rearward end of a valve chest F on the cylinder A.

The valve chest F has an annular recess G which extends to a point near the front end of the valve chest, thus leaving an end wall H which acts as an abutment for the front end of a bushing J disposed in the recess G. The bushing J may be secured in operative position in any suitable manner. The means for accomplishing this in the present instance consists of a threaded extension K which projects through the wall H and has a nut L screwed thereon to clamp the bushing J against the wall H.

In the rearward end of the recess G is disposed a bushing O spaced at its inner end from the bushing J to form an enlarged portion P of a valve chamber Q. On the rearward end of the bushing O is formed an annular flange R which cooperates with an enlarged portion S of the recess G for limiting longitudinal movement of the bushing O in a forwardly direction. The rearward end of the bushing O preferably lies flush with the corresponding end of the valve chest, thus enabling the back head E to bear thereagainst for preventing longitudinal movement of the bushing O in a rearwardly direction.

The valve chamber Q consists, in addition to the enlarged portion P, of bores T and U formed in the bushings O and J respectively, and the outer ends of the bores T and U in this instance terminate in enlarged recesses V and W.

Disposed in the valve chamber Q is a valve X for distributing pressure fluid to the front and rearward ends of the cylinder through inlet passages Y and Z respectively. The valve X has a bore $b$ therethrough for the passage of pressure fluid from the recess V to the recess W, such pressure fluid being conveyed to the recess V by a passage $c$ in the back head E and the bushing O.

Near the rearward end of the valve X is formed an external annular groove $d$ for establishing communication between the recess V and the inlet passage Z when the valve has been moved to its rearwardmost limiting position. The groove $d$ is suitably located to form an end flange $e$ on the valve which cooperates with the rearwardmost end of the bore T for cutting off communication between the recess V and the inlet passage Z. Similarly, the front end of the valve is provided with an external annular groove $f$ through which pressure fluid may be admitted from the recess W into the front inlet passage Y for impelling the piston B rearwardly. A flange $g$ at the front end of the valve cooperates with the front end of the bore U for cutting off communication between the front recess W and the inlet passage Y during the admission of pressure fluid to the rearward end of the cylinder.

Suitable means are provided for actuating the valve from one of its extreme positions to the other. These means in this instance comprise a central flange $h$ carried by the valve X and adapted to reciprocate in the enlarged portion P of the valve chamber which it divides into front and rearward pressure chambers $j$ and $k$ respectively. The front end $o$ and the rearward end $p$ of the flange $h$ constitute actuating surfaces against which pressure fluid may act for actuating the valve. The admission of pressure fluid to the pressure chambers $j$ and $k$ is in this instance effected through leak ports $q$ which move intermittently into registry with the said pressure chamber for admitting pressure fluid thereto. A suitable escape for such pressure fluid is afforded by an exhaust passage $r$ in the valve chest leading to the atmosphere and controlled by the flange $h$.

Pressure fluid is conveyed from the cylinder to the pressure chamber $k$ by a kicker passage $s$ and to the pressure chamber $j$ through a kicker passage $t$ for actuating the valve. The kicker passages $s$ and $t$ communicate with the cylinder at suitable points to enable pressure fluid to be admitted into the pressure chambers $j$ and $k$ at the most desirable period in the cycle of operations. In other words, these kicker passages are so positioned that they will be uncovered by the piston immediately prior to the time the piston reaches its extreme positions in the cylinder. In this way, as the piston approaches the ends of the cylinder, it will be cushioned by the in-rushing pressure fluid whereby it is again reversed.

In the present instance the pressure fluid used for impelling the piston B is exhausted through the inlet passages Y and Z, through the valve chamber Q and thence through front and rearward exhaust ports $u$ and $v$ to the atmosphere. The exhaust ports $u$ and $v$ are located between the enlarged portion T of the valve chamber and the inlet passages. Communication between the exhaust ports and the inlet passages is in this instance afforded through annular grooves $d$ and $f$ of the valve.

The operation of the device is as follows: With the valve X in the position illustrated in Figure 1, pressure fluid in the recess V will flow around the flange $e$ through the annular groove $d$ and the inlet passage Z into the rearward end of the cylinder to actuate the piston B forwardly. While the valve is in this position, there will be a constant flow of pressure fluid through the front leak port $q$ into the pressure chamber $j$ and, expanding therein, will exert sufficient pressure against the actuating surface $o$ to hold the valve X immovable in its rearwardmost limiting position.

After the piston B has advanced a certain distance in a forwardly direction, the kicker passage $s$ will be uncovered and a portion of the pressure fluid in the rearward end of the cylinder will flow through said kicker passage and, acting against the actuating surface $p$, will throw the valve forwardly to the position shown in Figure 2. The pressure fluid utilized for throwing the valve forwardly will then be exhausted to atmosphere through the exhaust passage $r$. In this position of the valve communication will be established between the inlet passage Z and the exhaust passage $v$ so that the inlet passage Z may function as a passage for conveying pressure fluid from the rearward end of the cylinder through the valve chamber P and the exhaust port $v$ to the atmosphere.

In the forward position of the valve, pressure fluid flowing through the bore $b$ into the recess W will flow over the flange $g$, through the annular groove $f$ and the inlet passage Y into the front end of the cylinder to return the piston to its initial position. During the rearward travel of the piston, the kicker passage $t$ will be uncovered thereby to admit pressure fluid into the pressure chamber $j$ for throwing the valve rearwardly to the position shown in Figure 1. While the valve is in this position, the rearward leak port $q$ will be sealed by the bushing O and the front leak port $q$ will be in registry with the pressure chamber $j$ to admit pressure fluid thereinto for holding the valve in its rearwardmost limiting position. While the valve is in this position, the front end of the cylinder will be in communication with the atmosphere through the inlet passage Y, the annular groove $f$ and the front exhaust port $u$, and the pressure fluid utilized for impelling the piston rearwardly will then be exhausted through these channels.

I claim:

1. In a fluid actuated rock drill, the combination of a cylinder and piston, a valve chest having a valve chamber, a hollow distributing valve in the valve chamber through which pressure fluid passes, a flange on the valve having pressure surfaces against which pressure fluid acts for actuating the valve to, and holding it in, that end of the valve chamber corresponding to the end of the cylinder to which pressure fluid is being admitted, and grooves in the surface of the valve to convey pressure fluid from the ends of the valve chamber to the cylinder.

2. In a fluid actuated rock drill, the combination of a cylinder and piston, a valve chest, a valve chamber in the valve chest having an intermediate enlarged portion and enlarged recesses at its ends, a hollow distributing valve in the valve chamber through which pressure fluid passes, a flange on the valve dividing the enlarged portion of the valve chamber into pressure chambers, kicker passages conveying pressure fluid to the pressure chambers for actuating the valve, and leak ports for admitting pressure fluid into the pressure chambers for holding the valve in its limiting positions, and grooves in the surface of the valve to establish communication between the recess and the inlet passages.

3. In a fluid actuated rock drill, the combination of a cylinder and piston, a valve chest having a valve chamber with an intermediate enlarged portion, said valve chamber having enlarged recesses at its ends in constant communication with a source of pressure fluid supply, a distributing valve in the valve chamber having a bore therethrough for the passage of pressure fluid, said valve having external annular grooves for admitting pressure fluid from the recesses to the cylinder, a flange on the valve dividing the enlarged portion of the valve chamber into pressure chambers, kicker passages conveying pressure fluid from the cylinder to the pressure chambers for actuating the valve, and leak ports in the valve intermittently conveying pressure fluid into the pressure chambers to hold the valve in thrown position.

4. In a fluid actuated rock drill, the combination of a cylinder and piston, a valve chest having a valve chamber with an intermediate enlarged portion, said valve chamber having enlarged recesses at its ends in constant communication with a source of pressure fluid supply, exhaust ports in the valve chest, inlet passages leading from the valve chamber to the cylinder, a distributing valve in the valve chamber having a bore therethrough for the passage of pressure fluid, said valve having external annular grooves near its ends to establish communication between the recesses and the inlet passages and between the inlet passages and the exhaust ports, a central flange on the valve dividing the enlarged portion of the valve chamber into pressure chambers, kicker passages conveying pressure fluid from the cylinder to the pressure chambers for actuating the valve, and leak ports in the valve conveying pressure fluid intermittently into the pressure chambers for holding the valve during the admission of pressure fluid to the cylinder.

5. In a fluid actuated rock drill, the combination of a cylinder and piston, a valve chest having a valve chamber with an intermediate enlarged portion, said valve chamber having enlarged recesses at its ends in constant communication with a source of pressure fluid supply, a distributing valve in the valve chamber having a bore therethrough for the passage of pressure fluid, said valve having external annular grooves for admitting pressure fluid from the recesses around the ends of the valve to the cylinder, a flange on the valve dividing the enlarged portion of the valve chamber into pressure chambers, kicker passages conveying pressure fluid from the cylinder to the pressure chambers for actuating the valve, said kicker passages being controlled only by the piston, and leak ports in the valve intermittently conveying pressure fluid into the pressure chambers to hold the valve in thrown position.

6. In a fluid actuated rock drill, the combination of a cylinder and piston, a valve chest having a valve chamber, a hollow distributing valve adapted to reciprocate in the valve chamber and through which pressure fluid passes to feed the forward end of the cylinder, valve seats at each end of the chest adapted to be closed by the ends of the valve to permit fluid to pass through said valve to the forward end of the cylinder or to flow past said valve to the rearward end of the cylinder, a flange on the valve having pressure faces against which pressure fluid acts for actuating the valve to hold it in that end of the valve chamber corresponding to the end of the cylinder to which the pressure fluid is being admitted, and grooves in the surface of the valve through which pressure fluid flows from the valve chamber to the cylinder.

7. In a fluid actuated rock drill, the combination of a cylinder and piston, a valve chest having a valve chamber, a hollow distributing valve in the valve chamber adapted to reciprocate in the valve chamber and through which pressure fluid passes, valve seats in each end of the valve chest, there being passages adjacent each valve seat and inwardly thereof leading to opposite ends of the cylinder, said valve being adapted to have its ends selectively engage the valve seats to cause the pressure fluid to pass through said valve to one end of the cylinder or around said valve to the other end of the cylinder, means controlled by the movement of the piston for kicking said valve to either position, and grooves in the surface of the valve to afford communication between the ends of the valve chamber and the passages.

8. In a fluid actuated rock drill, the combination of a cylinder and a piston, a valve chest, a valve chamber in the valve chest having enlarged recesses, a hollow distributing valve in the valve chamber through which pressure fluid passes, a flange on the valve having pressure surfaces against which pressure fluid acts for actuating the valve to move its ends into the enlarged recesses, and grooves in the periphery of the valve for conveying pressure fluid from the valve chamber to the cylinder.

In testimony whereof I have signed this specification.

RUSSELL H. WILHELM.